US011514136B2

(12) United States Patent
Wen et al.

(10) Patent No.: US 11,514,136 B2
(45) Date of Patent: Nov. 29, 2022

(54) CIRCUIT FOR NEURAL NETWORK CONVOLUTIONAL CALCULATION OF VARIABLE FEATURE AND KERNEL SIZES

(71) Applicant: Aspiring Sky Co. Limited, Hong Kong (CN)

(72) Inventors: Yujie Wen, Shanghai (CN); Zhijiong Luo, Hopewell Township, PA (US)

(73) Assignee: Aspiring Sky Co. Limited, Hong Kong (CN)

( * ) Notice: Subject to any disclaimer, the term of this patent is extended or adjusted under 35 U.S.C. 154(b) by 267 days.

(21) Appl. No.: 15/931,730

(22) Filed: May 14, 2020

(65) Prior Publication Data

US 2020/0364288 A1 Nov. 19, 2020

Related U.S. Application Data

(60) Provisional application No. 62/849,175, filed on May 17, 2019.

(51) Int. Cl.
*G06F 17/15* (2006.01)
*G06F 17/16* (2006.01)

(52) U.S. Cl.
CPC ............ *G06F 17/153* (2013.01); *G06F 17/16* (2013.01)

(58) Field of Classification Search
CPC ........ G06F 17/15; G06F 17/153; G06F 17/16; G06N 3/063
See application file for complete search history.

(56) References Cited

U.S. PATENT DOCUMENTS

| 9,940,534 | B1 | 4/2018 | Yang et al. | |
|---|---|---|---|---|
| 11,138,292 | B1 * | 10/2021 | Nair | G06F 17/16 |
| 2017/0097884 | A1 * | 4/2017 | Werner | G06F 15/76 |
| 2018/0137084 | A1 * | 5/2018 | Du | G06F 17/153 |
| 2019/0187983 | A1 * | 6/2019 | Ovsiannikov | G06F 7/5443 |

(Continued)

OTHER PUBLICATIONS

Efficient object detection using embedded binarizedneural networks, Journal of Signal Processing Systems, Jun. 2018, vol. 90, Issue 6. pp. 11.

(Continued)

*Primary Examiner* — Emily E Larocque
*Assistant Examiner* — Carlo Waje
(74) *Attorney, Agent, or Firm* — RatnerPrestia (57) ABSTRACT

A circuit for performing parallel convolutional computation for features and kernels of variable sizes may receive inputs of an m×n matrix of feature data, an m×n matrix of convolution data, and a (2m−1)×(2n−1) matrix of kernel data. A feature manager of the circuit may hold m rows of n data buffers storing the input feature data and rotating values between rows during one restricted convolution calculation. A kernel manager of the circuit may hold a (2m−1)×(2n−1) matrix of data buffers storing the input kernel data in the buffers and cyclically rotating values in upwards, downwards, leftwards and rightwards directions for different restricted convolution calculations. A row convolution engine of the circuit may hold m row convolution processors, each storing and updating input convolution data by multiplication-and-accumulation (MAC) operations on its input feature and kernel data rows. The circuit produces accumulated convolutional data.

18 Claims, 12 Drawing Sheets

(56) References Cited

U.S. PATENT DOCUMENTS

| | | | |
|---|---|---|---|
| 2019/0286975 A1* | 9/2019 | Feinberg | G06N 3/04 |
| 2019/0340486 A1* | 11/2019 | Mills | G06N 3/02 |
| 2020/0167405 A1* | 5/2020 | Suk | G06T 1/20 |
| 2020/0272779 A1* | 8/2020 | Boesch | G06F 30/34 |

OTHER PUBLICATIONS

Eyeriss: an energy-efficient reconfigurable accelerator for deep convolutional neural networks, IEEE International Solid-State Circuits Conference, ISSCC 2016.

* cited by examiner

CIRCUIT FOR NEURAL NETWORK CONVOLUTIONAL CALCULATION OF VARIABLE FEATURE AND KERNEL SIZES

CROSS REFERENCE TO RELATED APPLICATIONS

This application claims the benefit of U.S. Provisional Patent Application Ser. No. 62/849,175 filed on May 17, 2019. The disclosures of the provisional application are hereby incorporated by reference for all purposes.

BACKGROUND

Unless otherwise indicated herein, the materials described in this section are not prior art to the claims in this application and are not admitted to be prior art by inclusion in this section.

Convolutional neural networks are a class of deep neural networks with shared-weights architecture and translation invariance characteristics and commonly used in applications in image and video recognition, recommender systems, image classification, medical image analysis, natural language processing, and financial time series. Convolutional neural networks are regularized versions of multilayer perceptrons. Convolutional neural networks take advantage of the hierarchical pattern in data and assemble more complex patterns using smaller and simpler patterns. A convolutional neural network typically includes an input and an output layer, as well as multiple hidden layers. The hidden layers of a convolutional neural network include a series of convolutional layers that convolve with a multiplication or other dot product.

SUMMARY

Briefly stated, technologies are generally described herein for neural network convolutional calculation of variable feature and kernel sizes, circuits, and methods thereof.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description and drawings are not meant to be limiting. Other embodiments may be utilized, and other changes may be made, without departing from the spirit or scope of the subject matter presented herein. The aspects of the present disclosure, as generally described herein, and illustrated in the figures, can be arranged, substituted, combined, separated, and designed in a wide variety of different configurations, all of which are explicitly contemplated herein.

This disclosure is generally drawn, inter alia, to technologies for neural network convolutional calculation of variable feature and kernel sizes, circuits, and methods thereof a circuit for performing parallel convolutional computation for features and kernels of variable sizes may receive inputs of an m×n matrix of feature data, an m×n matrix of convolution data, and a (2m−1)×(2n−1) matrix of kernel data. A feature manager of the circuit may hold m rows of n data buffers storing the input feature data and rotating values between rows during one restricted convolution calculation. A kernel manager of the circuit may hold a (2m−1)×(2n−1) matrix of data buffers storing the input kernel data in the buffers and cyclically rotating values in upwards, downwards, leftwards and rightwards directions for different restricted convolution calculations. A row convolution engine of the circuit may hold m row convolution processors, each storing and updating input convolution data by multiplication-and-accumulation (MAC) operations on its input feature and kernel data rows. Each processor may accept one feature row data from the same position in the feature manager and all kernel row data from the kernel manager. The circuit produces accumulated convolutional data $M \boxdot K + C$, where M, K and C are the input feature, kernel and convolution data, $\boxdot$ is a restricted convolution controlled by the input vertical and horizontal range control data.

Figure 1:
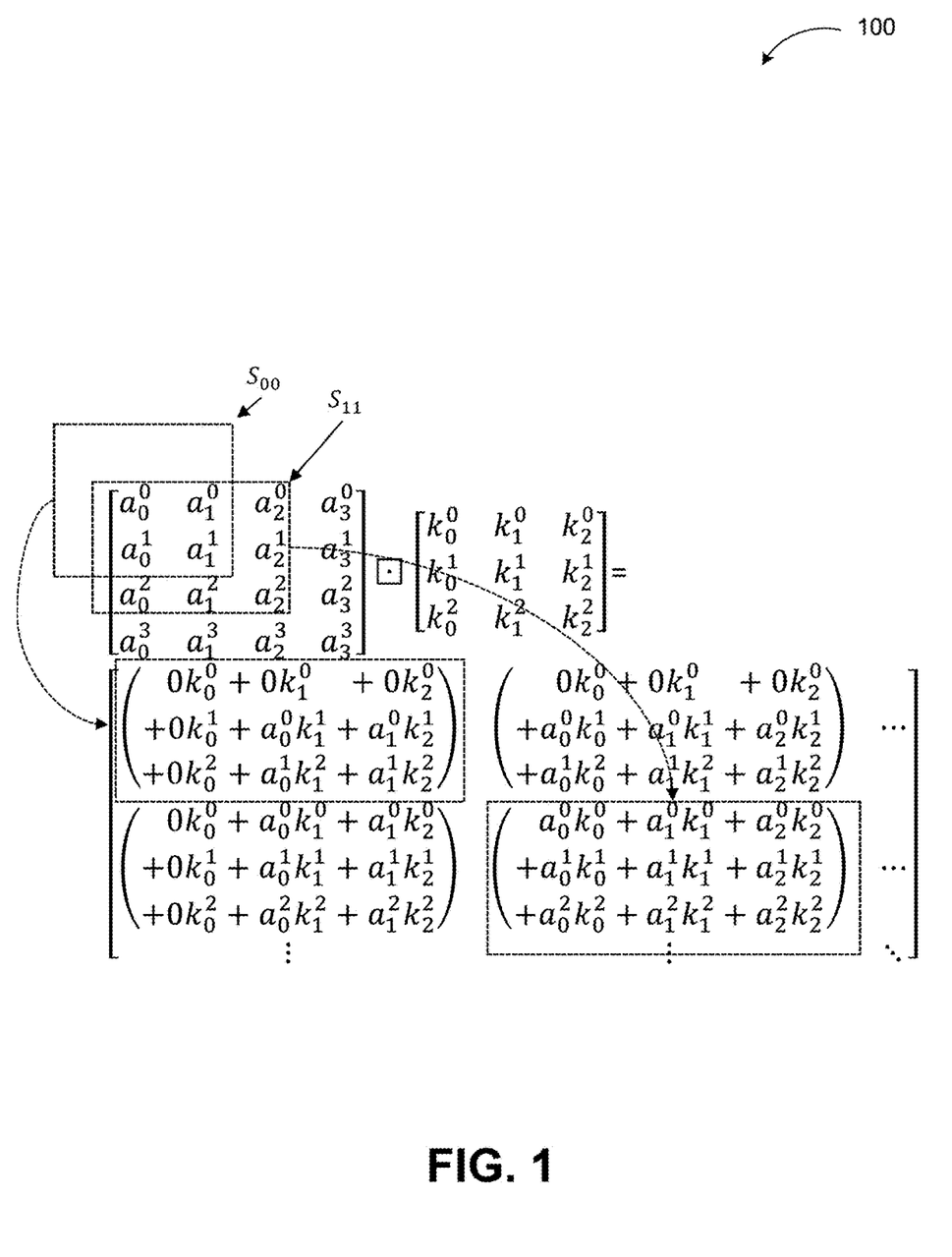
FIG. 1 illustrates a convolution of two matrices resulting in a new matrix the same size as the first matrix in the convolution.

FIG. 1 illustrates a convolution of two matrices resulting in a new matrix the same size as the first matrix in the convolution, arranged in accordance with embodiments described herein.

In neural networks, a convolution $M \boxdot K$, which involves two matrices M and K, produces a matrix C of the same size of M and satisfies that the element of C at row i and column j is the sum of element-wise product of a matrix $S_{ij}$ and K, where $S_{ij}$ of the same size of K is a sub-matrix of M and whose center is at row i and column j.

If an element of $S_{ij}$ is at the outside of M, then the element is always 0. Such convolution is also called a 0-padding convolution. There are other types of convolutions using different padding methods. Embodiments are directed to implementation of 0-padding convolutions but can be easily adapted to convolutions of other types. M is usually referred as a feature matrix and K as a kernel matrix.

The equation in diagram 100 is an example convolution where M is a 4×4 matrix and K is a 3×3 one. Only the 4 elements around the upper-left corner of M ⊡ K are shown. Two sub-matrix $S_{00}$ and $S_{11}$ used for calculating elements at location (0, 0) and (1, 1) are marked out by the dashed boxes. Note the upper and left edges of $S_{00}$ are at the outside of M. The missing elements are replaced with zeros.

Figure 2:
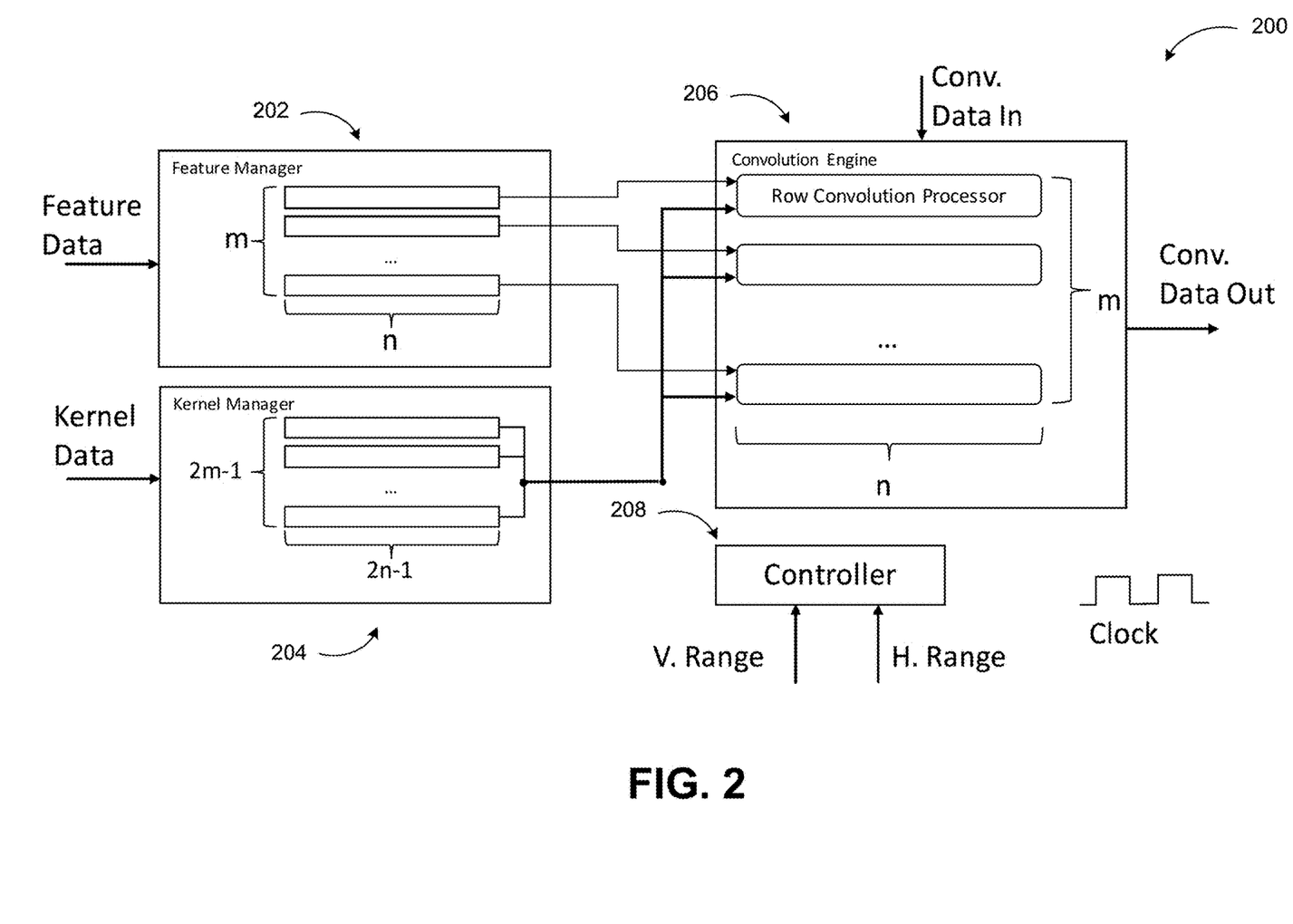
FIG. 2 illustrates a top-level diagram of a circuit structure for performing parallel convolutional computation for features and kernels of variable sizes.

FIG. 2 illustrates a top-level diagram of a circuit structure for performing parallel convolutional computation for features and kernels of variable sizes, arranged in accordance with embodiments described herein.

Embodiments include a circuit structure 200 for performing parallel convolutional computation for features and kernels of variable sizes. The circuit receives inputs of an m×n matrix of feature data, an m×n matrix of convolution data and a (2m−1)×(2n−1) matrix of kernel data. The circuit receives two extra controlling inputs called the vertical range and the horizontal range for restricting the convolution calculation. Each range data is a pair of integers ranging from −m to m for vertical range, and from −n to n for horizontal range.

The circuit produces accumulated convolutional data M ⊡ K+C, where M, K and C are the input feature, kernel and convolution data, ⊡ is a restricted convolution controlled by the input vertical and horizontal range. The detail about range restriction will be introduced in the following sections. The output convolution result also has size m×n.

The circuit involves 3 major blocks: (1) The feature manager 202 which further holds m rows of n data buffers. It stores the input feature data and rotate values between rows during one restricted convolution calculation. (2) The kernel manager 204 which holds a (2m−1)×(2n−1) matrix of data buffers. It stores the input kernel data in the buffers and cyclically rotate values in upwards, downwards, leftwards and rightwards directions for different restricted convolution calculations. (3) The convolution engine 206 holds m row convolution processors. Each processor stores and update the input convolution data by multiplication-and-accumulation (MAC) operations on its input feature and kernel data rows. Each processor accepts one feature row data from the same position in the feature manager 202 and all kernel row data from the kernel manager 204.

There is a top-level controller 208 for controlling the behaviors of the 3 major blocks. Routing of the controlling data, the vertical range and the horizontal range data to other blocks are not shown for brevity in the graph. Those kinds of data are assumed ubiquitously accessible for any blocks and sub-blocks. All the blocks' behavior is synchronized by an input clock signal.

Figure 3:
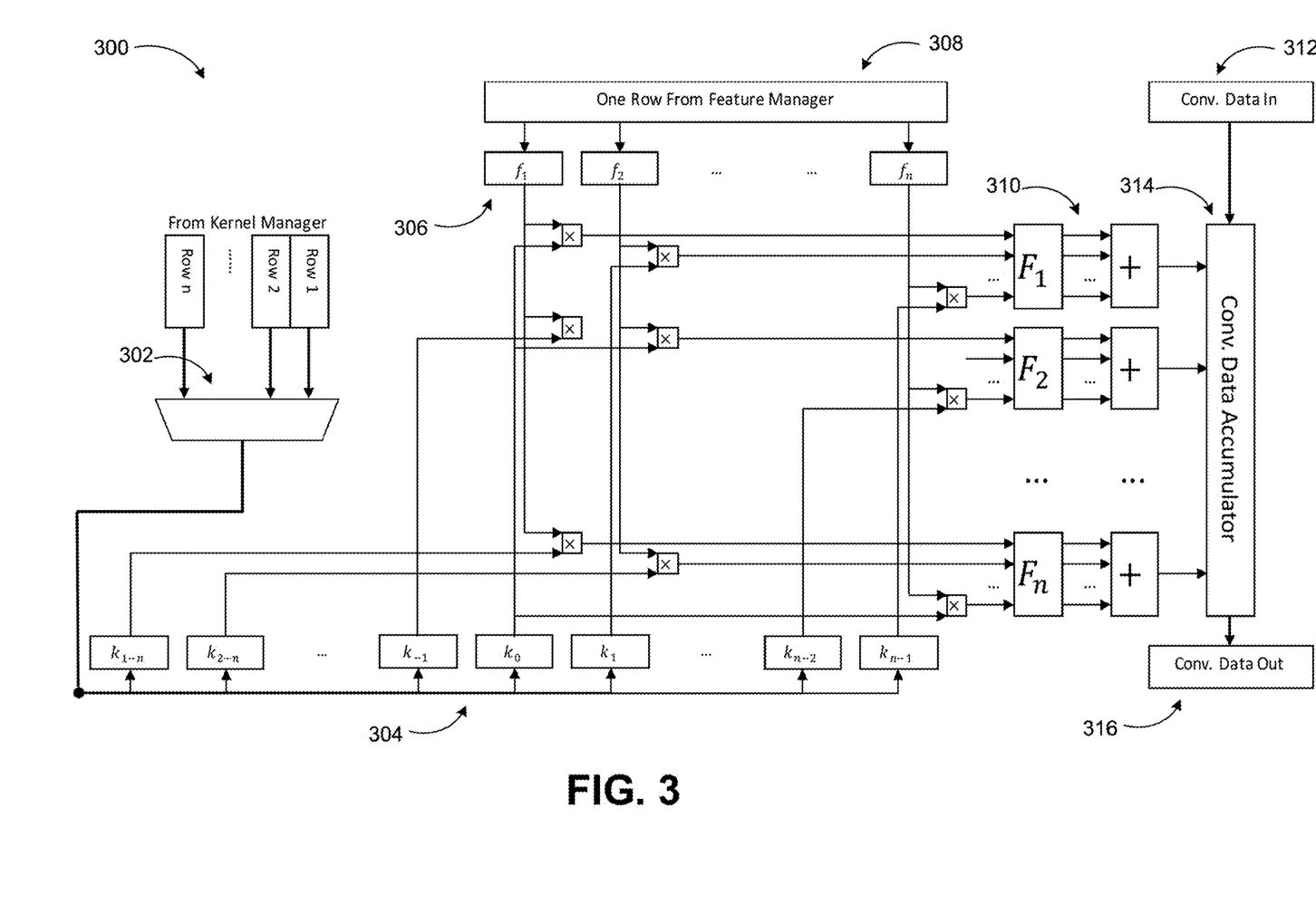
FIG. 3 is a schematic circuit diagram illustrating an example row convolution processor.

FIG. 3 is a schematic circuit diagram 300 illustrating an example row convolution processor, arranged in accordance with embodiments described herein.

The row convolution processor reads in one row of feature data from the feature manager 308, all the kernel rows from the kernel manager 302, one row of convolution data 312 and produces one row of accumulated convolution data 314, which is provided to convolution data output 316. The input feature row contains n feature values, denoted as $f_1$, $f_2$ to $f_n$ 306, shown at the top of the diagram. At each calculation step, one kernel row 304 is selected from the input kernel rows, according to the controller's input. The selected row contains 2n−1 kernel values, denoted as $k_{1-n}$, $k_{2-n}$, . . . , $k_{-1}$, $k_0$, $k_1$, . . . , $k_{n-2}$, $k_{n-1}$, is shown at the bottom of the diagram.

At the center of the graph is an n×n matrix of multipliers. The product at row i and column j of the matrix satisfies $$m_j^i = f_j k_{j-i}, \forall i \in [1, n], j \in [1, n]$$

The products of each row are sent to a filter bank 310 which selectively overwrites products to zero according to the input horizontal range. The exact overwritten function is:

$$F_i(m_j^i) = \begin{cases} m_j^i, & (j-i) \in [l, r] \\ 0, & \text{otherwise} \end{cases}$$

where l and r are the left and right boundaries of the horizontal range.

Each filtered product row is then sent to an adder to generate a filtered sum-of-product which is finally accumulated to the corresponding convolution values. The row convolution processor is capable of calculating partial convolution for a given feature row and a given kernel row in parallel. Such partial convolution is equivalent to the convolution on feature map matrix and kernel matrix both having only one row. The convolution engine is employed with m row convolution processors and thus is capable of perform m partial convolutions in parallel.

Figure 4:
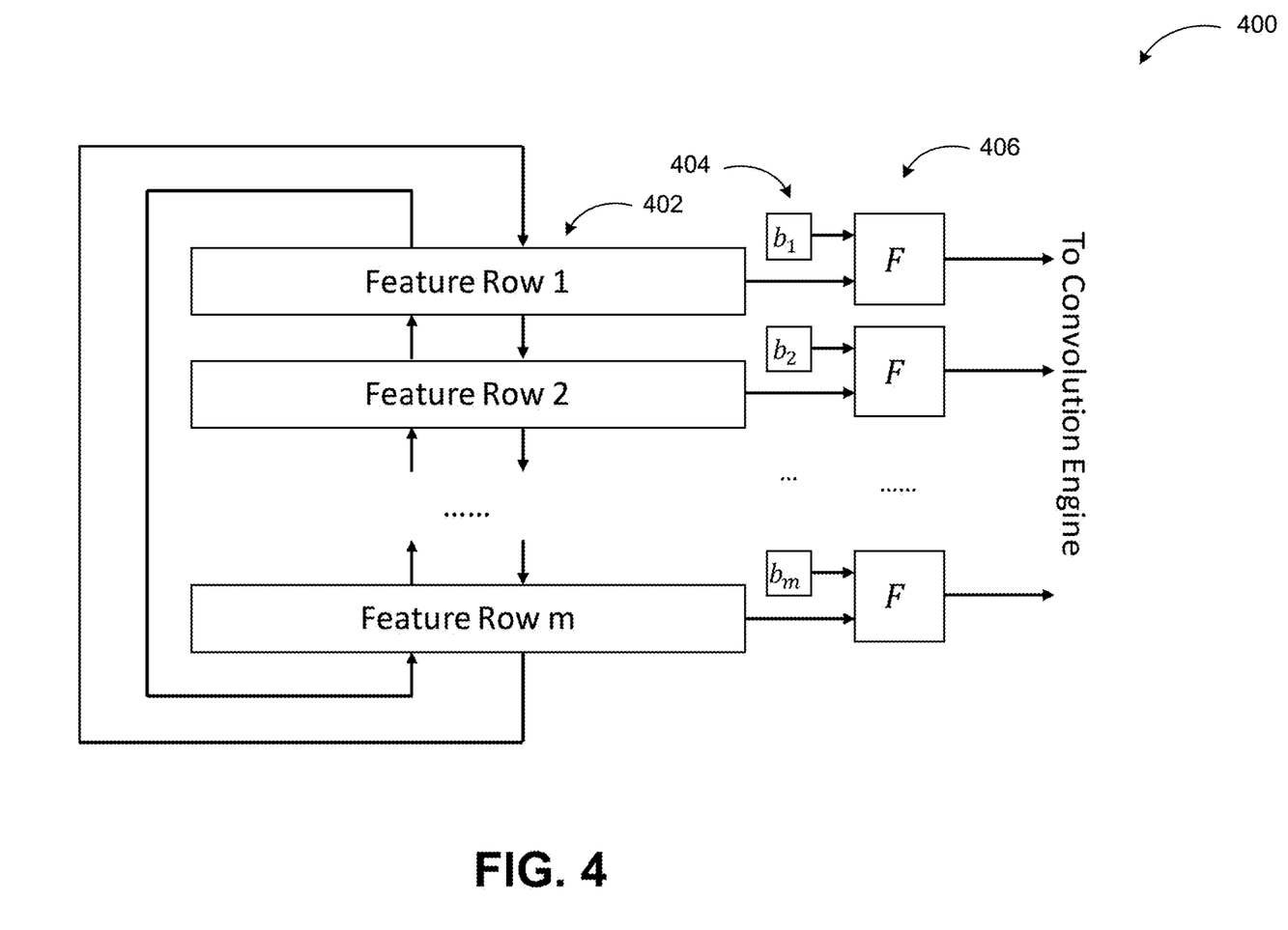
FIG. 4 is a schematic diagram illustrating an example feature manager.

FIG. 4 is a schematic diagram illustrating an example feature manager 400, arranged in accordance with embodiments described herein.

The feature manager 400 is employed with m feature rows 402, each of which is holding n feature values. The contents of feature rows can be cyclically rotated either upwards or downwards according to controlling signal. The manager maintains a bias value $b_i$ 404 for each row which records the bias between the row position and the original position of the contents it is hold. The bias values are updated when rotating row contents.

The contents are sent to a filter function F 406 which overwrites the input contents with all-zero values if the corresponding bias is out of the vertical range. By rotating rows, the feature manager can provide the contents of different rows to every row convolution processor in the convolution engine so that the row convolution processor can accumulate multiple row convolution results into complete convolution results. The initial row assignments, biases, and rotating directions and counts are controlled by the controller.

Figure 5:
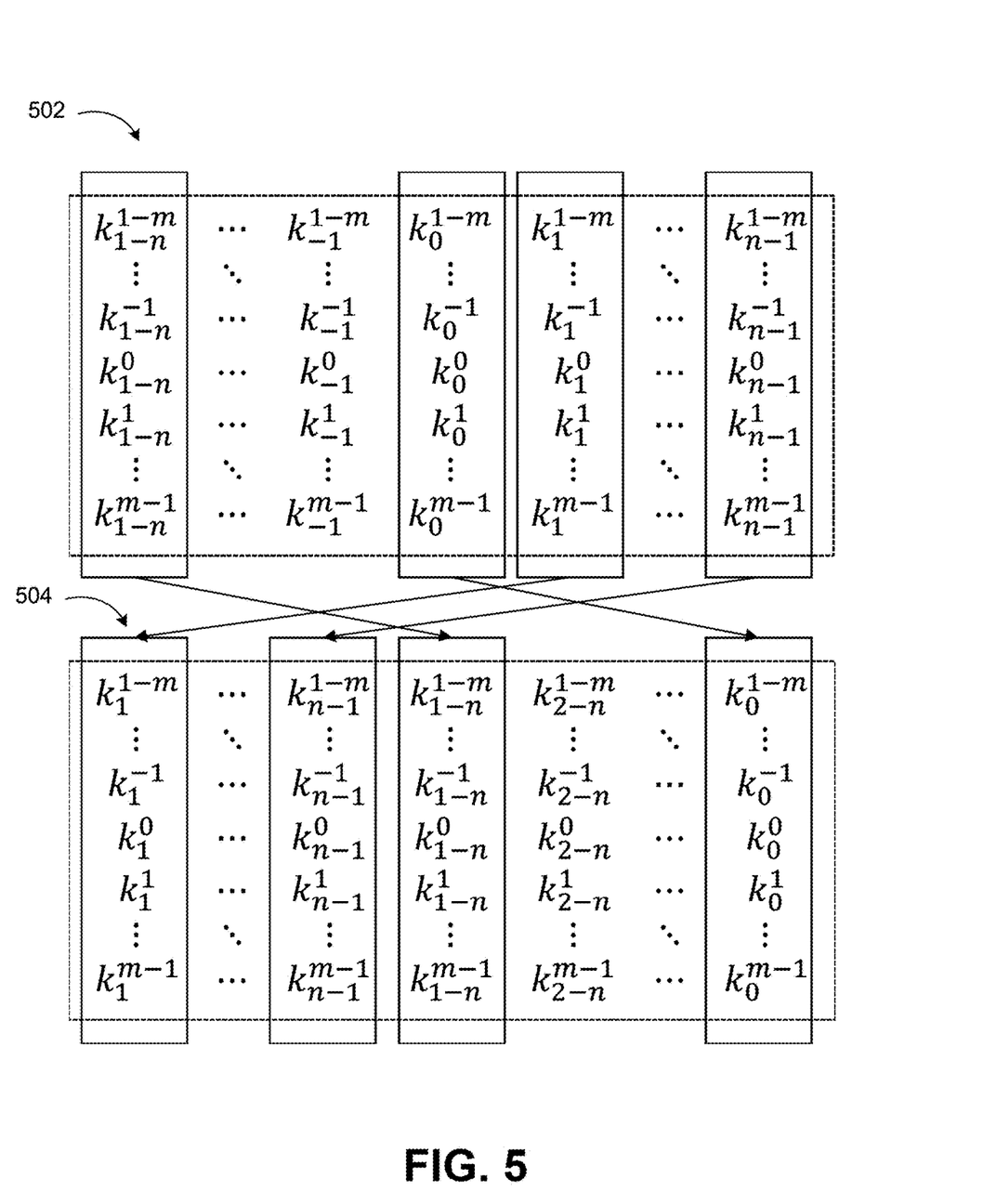
FIG. 5 is a schematic diagram illustrating an example kernel manager.

FIG. 5 is a schematic diagram illustrating an example kernel manager, arranged in accordance with embodiments described herein.

The kernel manager receives and maintains a (2m−1)×(2n−1) matrix of kernel values (502, 504). All the kernel values are accessible for each row convolution processor. The kernel manager can rotate the kernel values either in rows or in columns, in both directions. The pace of rotation is fixed at m rows for row rotation and n columns for column rotation.

Diagram 500 is an example of leftward column rotation. The 2m−1 rows are indexed from 1−m to m−1, while the 2n−1 columns are indexed from 1−n to n−1. $k_j^i$ denotes the matrix element at row i and column j. By the leftward column rotation, column 1 is moved to the left-most column 1–n. The original column 1–n is cyclically rotated to the center column 0 and the original column 0 is also cyclically rotated to the right-most column n–1. Other unmentioned columns are also rotated cyclically by the fixed pace of n columns. Rightward column rotation, upward and downward row rotation are done in similar manner.

Figure 6:
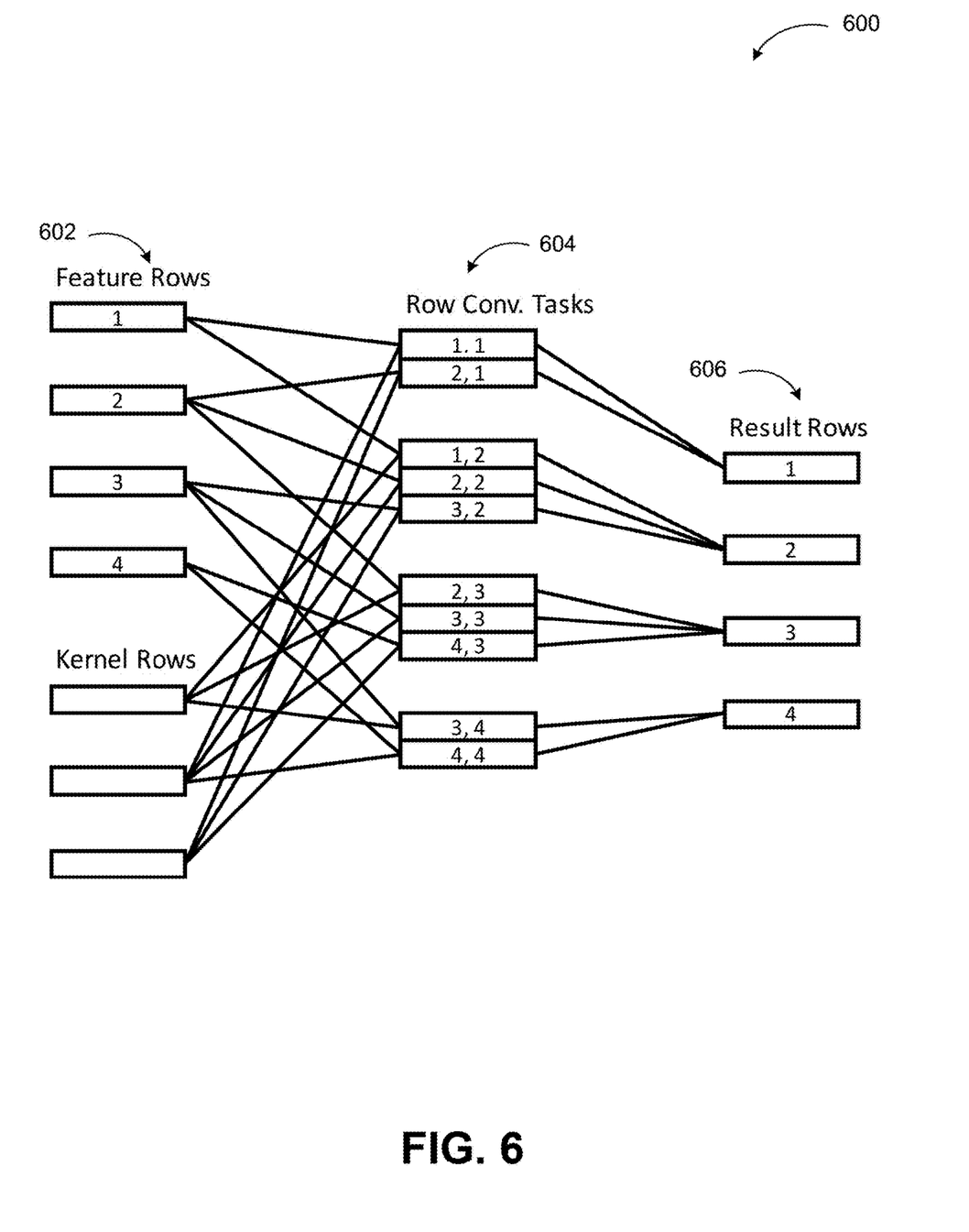
FIG. 6 illustrates example core convolutions.

FIG. 6 illustrates example core convolutions, arranged in accordance with embodiments described herein.

For a convolution C=M⊡K, if the size of M is no larger then m×n at both dimensions, C is referred as a core convolution. As shown in diagram 600, all the MAC operations of C can be grouped into multiple row convolution tasks 604 by the combination of the row indices of their input feature value in M and their output convolution value 606 in C. All the MAC operations in one such row convolution task can be performed in parallel by one row convolution processor with proper feature row data fed in and proper horizontal range assigned.

Row convolution tasks 604 are further organized into task groups by their destination row. Tasks of the same group are performed by the same row convolution processor corresponding in time-sharing manner. There are n row convolution processors employed in one convolution engine, each of which is reading a different feature row (602) from the feature manager. The rows in the feature manager can be shifted but cannot be permutated. So, a maximum n row convolution tasks from the n task groups can be performed as far as their source feature rows form a sequence which is a sub-sequence of any feature row shifting sequence.

Any row processor not assigned a task will not update their convolution partial sums. Such row processor control is done by assigning proper vertical range to the convolution engine. Diagram 600 shows all the row convolution tasks and the task groups for a convolution of 4×4 feature and 3×3 kernel. Each row convolution task is labeled with the indices of its source row and destination row. Stacked tasks are of the same group.

Figure 7:
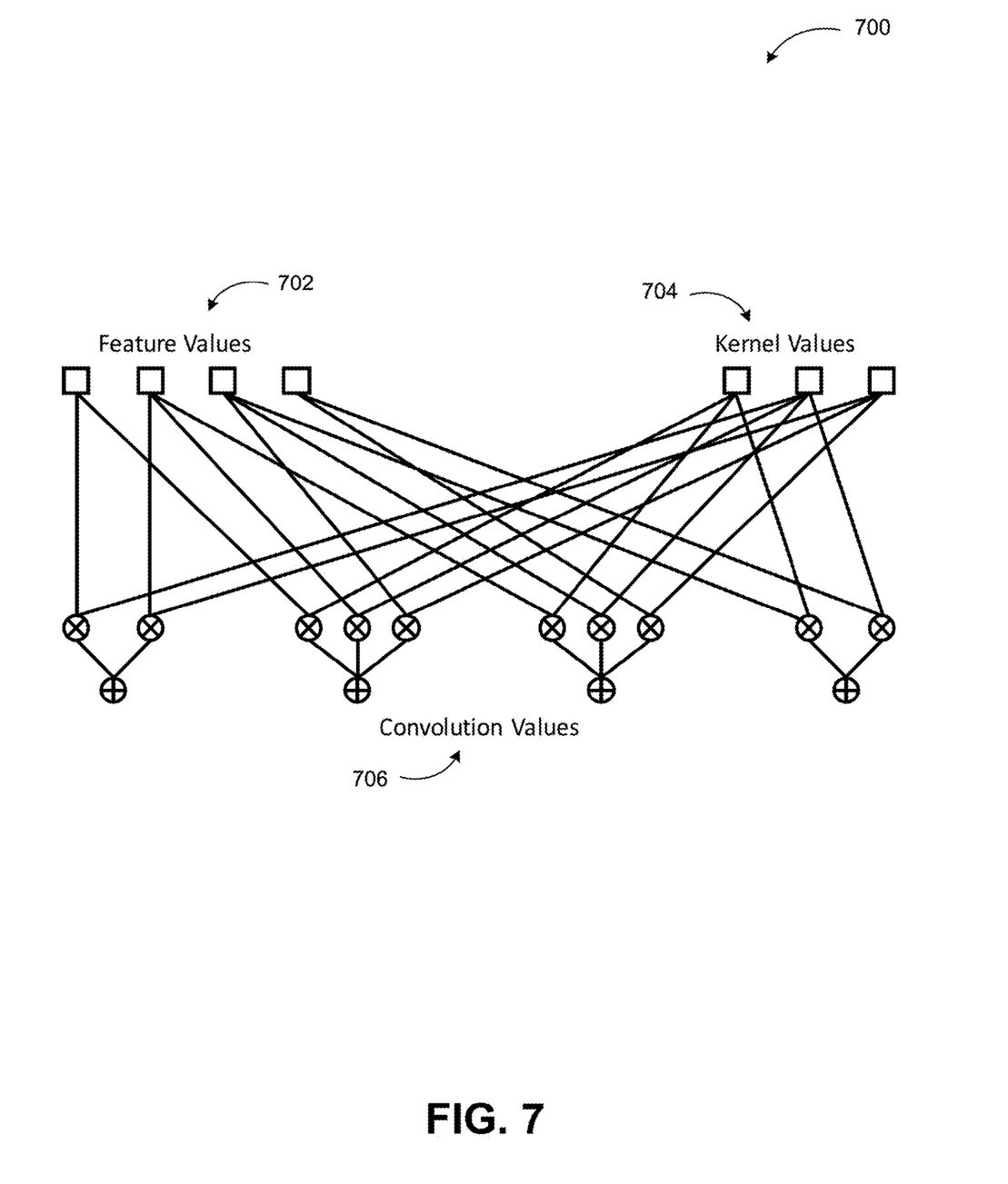
FIG. 7 illustrates input dependency of MAC operations within a row convolution task.

FIG. 7 illustrates input dependency of MAC operations within a row convolution task, arranged in accordance with embodiments described herein.

Diagram 700 shows the input dependency of MAC operations within a row convolution task. All the convolution tasks have the same structure in the example convolution 706 of 4×4 feature 702 and 3×3 kernel 704.

Figure 8:
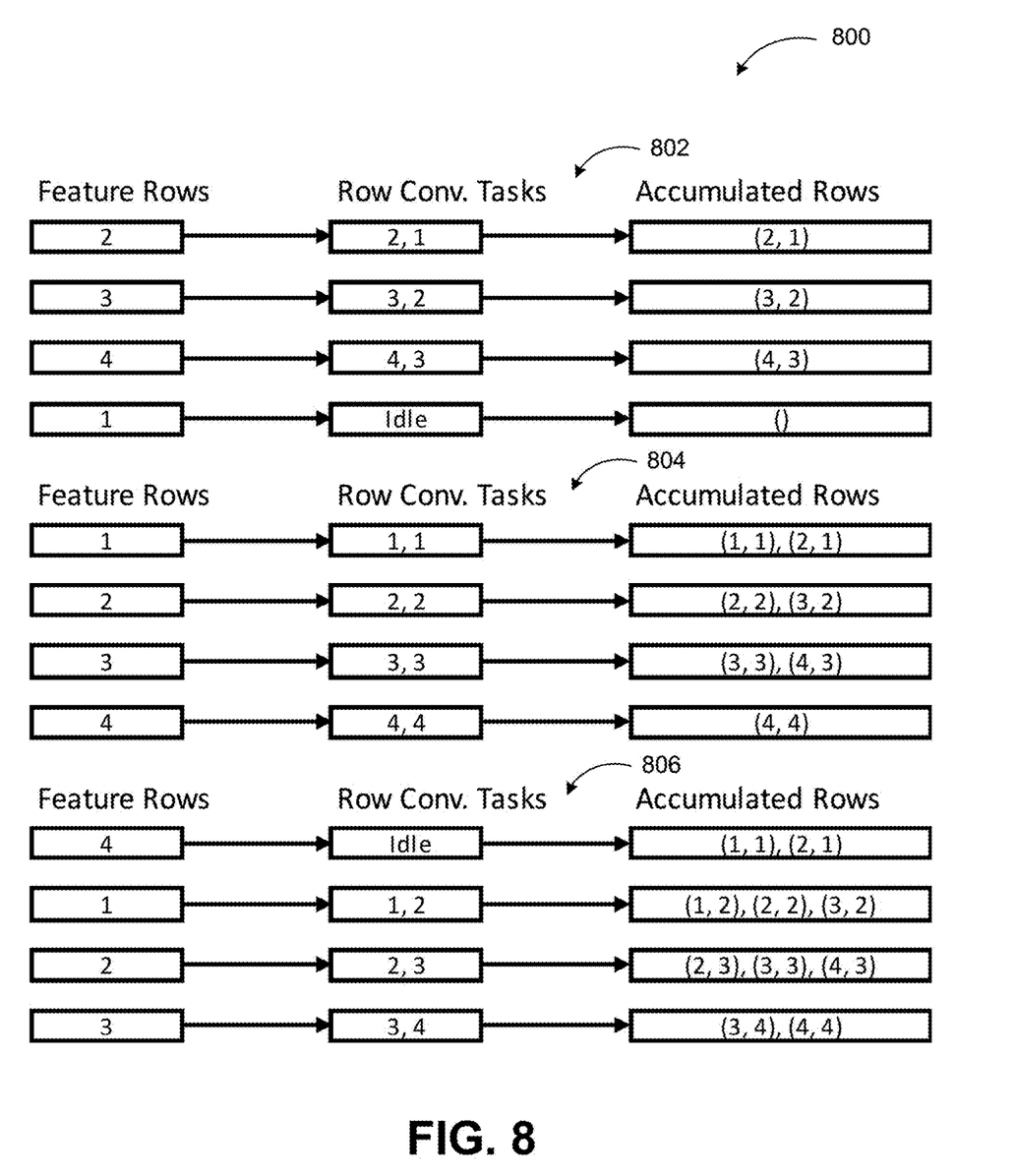
FIG. 8 illustrates task assignments for each row convolution processor in the 3 steps to complete an example convolution of 4×4 feature and 3×3 kernel.

FIG. 8 illustrates task assignments for each row convolution processor in the three steps to complete an example convolution of 4×4 feature and 3×3 kernel, arranged in accordance with embodiments described herein.

Diagram 800 shows the task assignments for each row convolution processor in the three steps (802, 804, 806) to complete the convolution of 4×4 feature and 3×3 kernel described in the previous figures. The row manager shifts downwards the feature rows after each step. Kernel rows are omitted as all kernel rows are available for all row convolution processors.

A row convolution processor does not update its convolution result if an improper feature row is fed in. Such processors are labeled "idle". The right-most boxes record the accumulated row convolution data till each step. After the three steps (802, 804, 806), all necessary row convolution data is accumulated, and the convolution calculation finishes.

Figure 9:
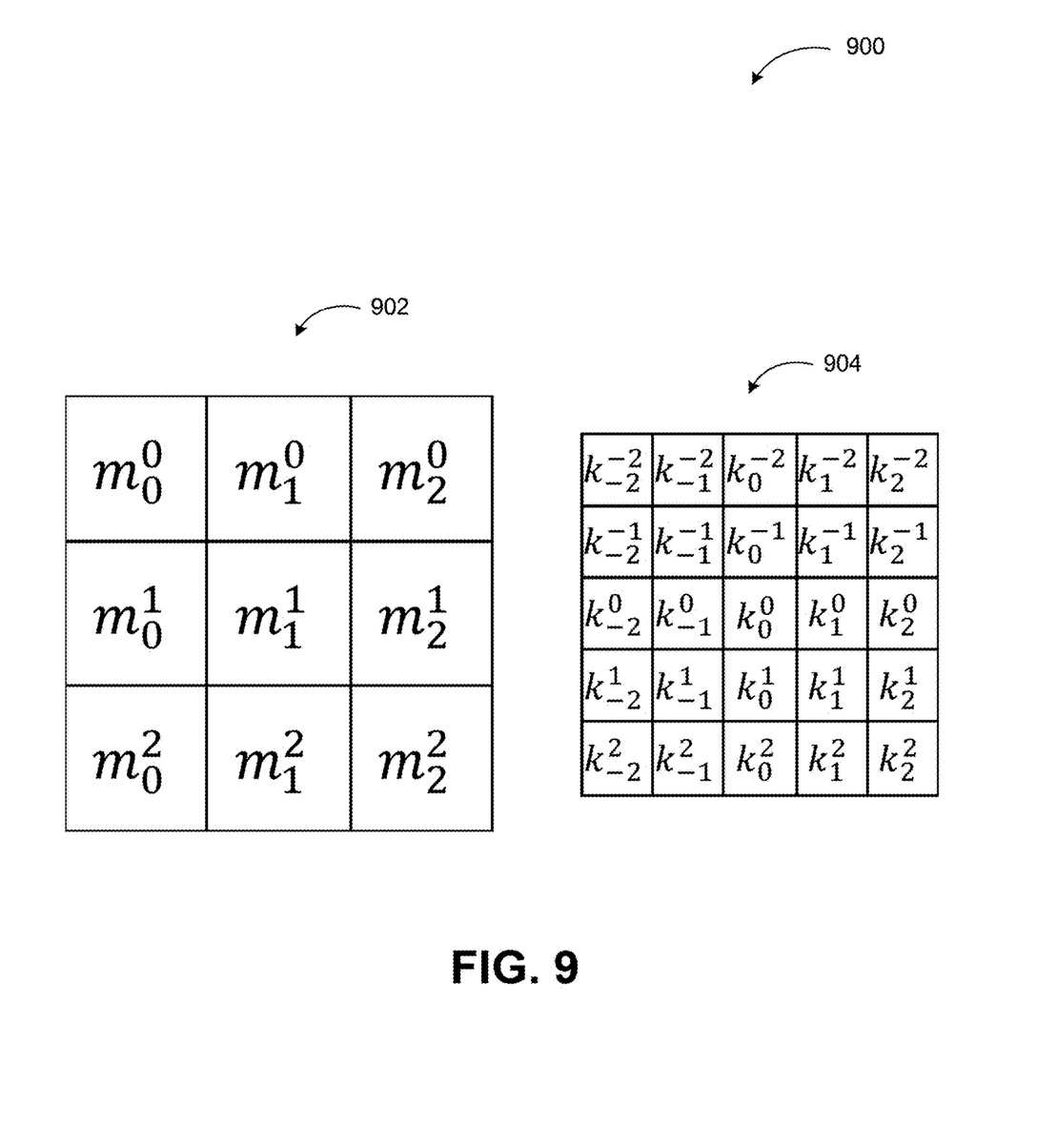
FIG. 9 illustrates an example compensated convolution.

FIG. 9 illustrates an example compensated convolution, arranged in accordance with embodiments described herein.

For a convolution C=M⊡K, where the size of M is larger than m×n in any dimension, but the size of K is no larger than (2m–1)×(2n–1) in both dimensions, then C can be achieved by multiple core convolutions on rotated kernels. First, if necessary, M is padded with zeros so that its size is a multiple of m×n. Then it is divided into multiple m×n sub-matrices.

For each sub-matrix, core convolution is performed on the sub-matrix itself and all its neighboring sub-matrices, so as to compensate the missing MAC operations on feature values of neighboring sub-matrices. The core convolutions on sub-matrix itself and all its neighboring sub-matrices as a whole is referred as a compensated convolution.

The kernel is rotated either horizontally or vertically during a compensated convolution, according to the relative position of the neighboring feature sub-matrix. The unnecessary MAC operations for a compensated convolution are filtered out by assigning proper vertical and horizontal ranges for each of its core convolution. The complete convolution C is achieved by performing compensated convolution on each of the sub-matrices.

Diagram 900 shows a 12×12 feature matrix 902 divided into 9 sub-matrices of size 4×4, and a 5×5 kernel matrix 904. The compensated convolution on sub-matrix mg involves core convolution on mg and its 3 neighbors $m_0^1$, $m_1^0$ and $m_1^1$. While the compensated convolution on sub-matrix $m_1^1$ involves core convolutions on all the 9 sub-matrices. The kernel rotations and ranges for each core convolution of the compensated convolution for mg are showed in FIG. 10.

Figure 10:
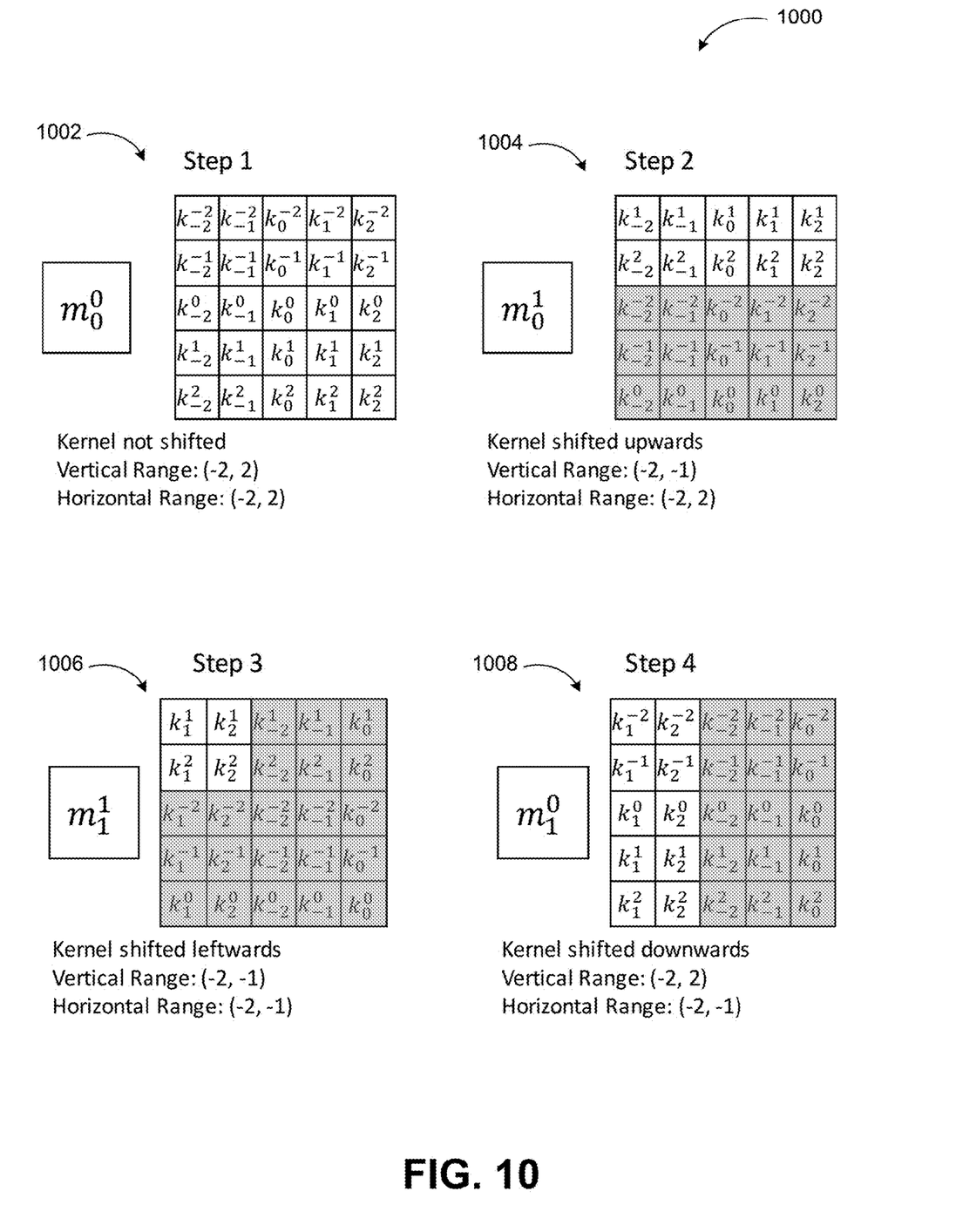
FIG. 10 illustrates four core convolutions involved in a compensated convolution for a sub-matrix $m_0^0$.

FIG. 10 illustrates four core convolutions involved in a compensated convolution for a sub-matrix $m_0^0$, arranged in accordance with embodiments described herein.

Diagram 1000 illustrates the four core convolutions involved in the compensated convolution for sub-matrix $m_0^0$. The four core convolutions are performed by the same convolution engine in four steps 1002, 1004, 1006, 1008, each step for one core convolution.

The kernel is shifted before step 2, 3 and 4. Different vertical and horizontal ranges are specified to filter out unnecessary partial sums. The shaded kernel elements are those ignored due to the specified ranges.

Figure 11:
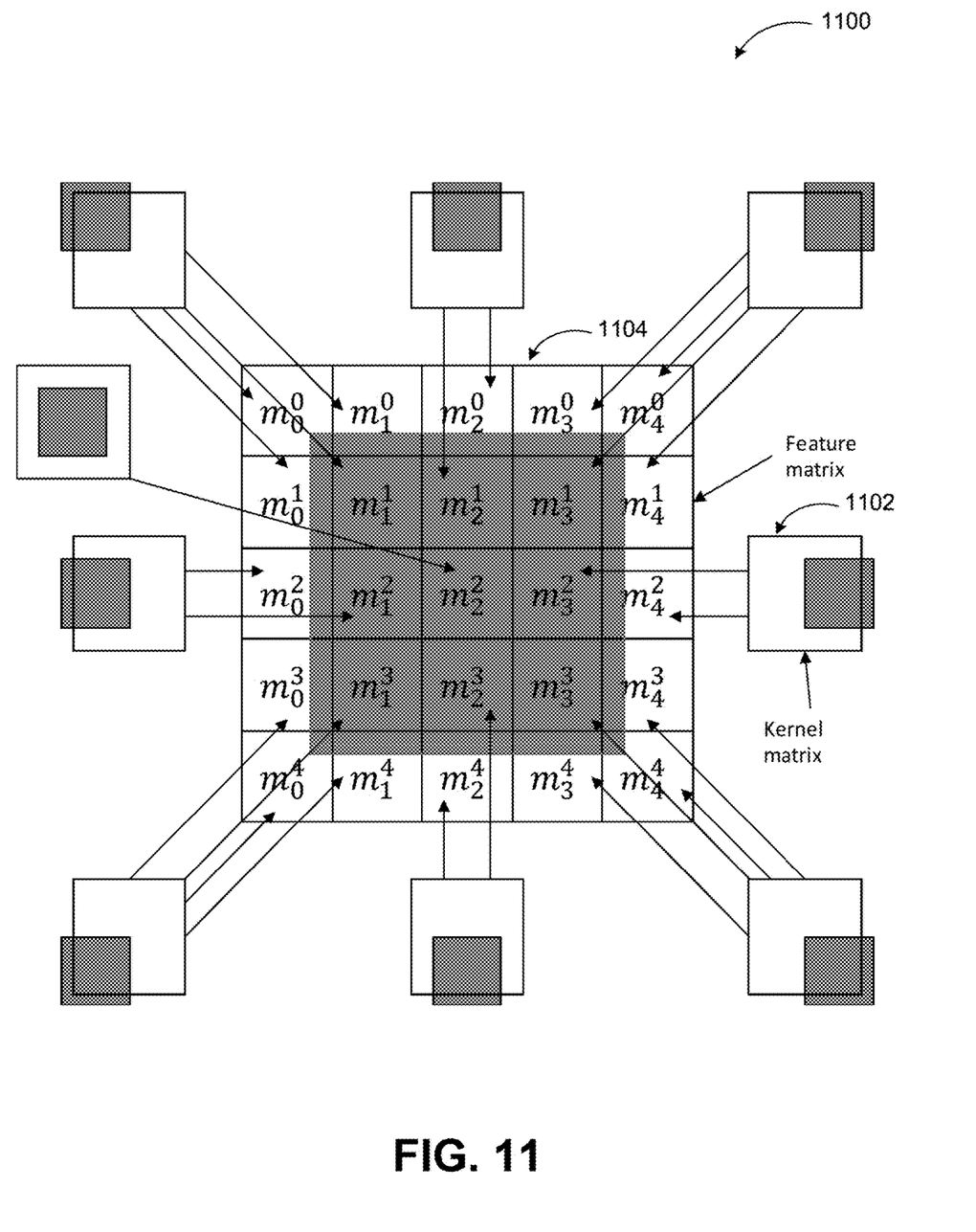
FIG. 11 illustrates an example extended convolution.

FIG. 11 illustrates an example extended convolution, arranged in accordance with embodiments described herein.

For a convolution C=M⊡K, where the size of M is larger than m×n in any dimension and the size of K is larger than (2m–1)×(2n–1) in any dimension, C can still be computed by the convolution engine performing core convolution and compensated convolution on different sub-matrix of K.

First, M 1104 is padded and divided into multiple sub-matrices in the same manner of compensated convolution. Then, for each sub-matrix $m_j^i$ of M 1104, the sub-matrix $c_j^i$ is computed in the same position of C. For each $c_j^i$, there is a minimum set $S_j^i$ of sub-matrices of M 1104 that covers all the feature values necessary to compute $c_j^i$. Every sub-matrix in $S_j^i$ is fed into the convolution engine with proper sub-matrix of K 1102, proper vertical and horizontal ranges to perform either core convolutions or compensated convolutions. Such a convolution process is referred as an extended convolution.

C is obtained by performing extended convolutions on every sub-matrix of C. Diagram 1100 illustrates the idea of extended convolution. At the center of the diagram is an M 1104 of size 20×20, divided into 25 sub-matrices, each of which is of size 4×4. The size of K 1102 is 11×11. The shaded area of M covers all the necessary feature values for computing $c_2^2$, the center sub-matrix of C. Then all the sub-matrices of M overlap with the shaded area and are necessary for the extended convolution for $c_2^2$.

Around M are the sub-matrix of K used for each convolution calculation. The white box illustrates K while the shaded area illustrates the sub-matrix used for convolutions on the sub-matrices of M its arrows are pointing to. Note the part of the shades that are out of the kernel denotes values ignored by the corresponding convolution calculations. Those convolutions sharing the same kernel sub-matrix are done in one compensated convolution. The remain convolutions are done in separate core convolutions.

Some embodiments are directed to a circuit structure for performing parallel convolutional computation for features and kernels of variable sizes. The operations of any process described herein are not necessarily presented in any particular order and that performance of some or all of the operations in an alternative order(s) is possible and is contemplated. The operations have been presented in the demonstrated order for ease of description and illustration. Operations may be added, combined, modified, omitted, and/or performed simultaneously, in a different order, etc., without departing from the scope of the present disclosure.

The illustrated process can be ended at any time and need not be performed in its entirety. Some or all operations of the processes, and/or substantially equivalent operations, can be performed by execution by one or more processors of computer-readable instructions included on a computer storage media, such as described herein, including a tangible non-transitory computer-readable storage medium. The term "computer-readable instructions," and variants thereof, as used in the description and claims, is used expansively herein to include routines, applications, application modules, program modules, programs, components, data structures, algorithms, or the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, or the like.

Figure 12:
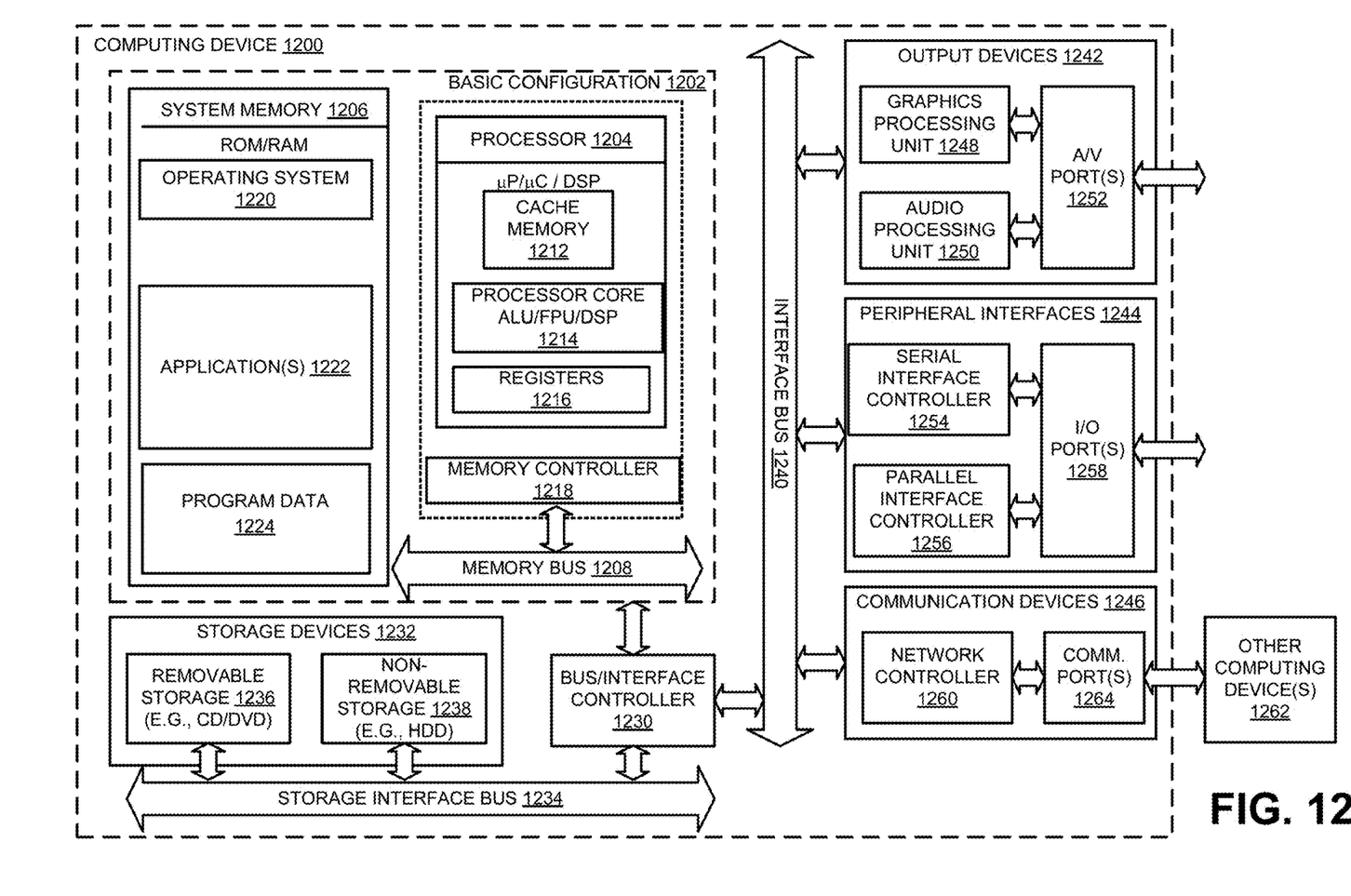
FIG. 12 illustrates an example computing device, where embodiments may be implemented, all arranged according to at least some embodiments presented herein.

FIG. 12 is a block diagram illustrating an example computing device 1200 that is arranged to incorporate or operate a digital integrated circuit with embedded memory for neural network inferring, in accordance with at least some embodiments described herein. In a very basic configuration 1202, computing device 1200 typically includes one or more processors 1204 and system memory 1206. A memory bus 1208 can be used for communicating between the processor 1204 and the system memory 1206.

Depending on the desired configuration, processor 1204 can be of any type including but not limited to a microprocessor ($\mu$P), a microcontroller ($\mu$C), a digital signal processor (DSP), or any combination thereof. Processor 1204 can include one more levels of caching, such as cache memory 1212, a processor core 1214, and registers 1216. The processor core 1214 can include an arithmetic logic unit (ALU), a floating point unit (FPU), a digital signal processing core (DSP core), or any combination thereof. A memory controller 1218 can also be used with the processor 1204, or in some implementations the memory controller 1212 can be an internal part of the processor 1204.

Depending on the desired configuration, the system memory 1206 can be of any type including but not limited to volatile memory (such as RAM), non-volatile memory (such as ROM, flash memory, etc.) or any combination thereof. System memory 1206 typically includes an operating system 1220, one or more applications 1222, and program data 1224.

Computing device 1200 can have additional features or functionality, and additional interfaces to facilitate communications between the basic configuration 1202 and any required devices and interfaces. For example, a bus/interface controller 1240 can be used to facilitate communications between the basic configuration 1202 and one or more data storage devices 1232 via a storage interface bus 1234. The data storage devices 1232 can be removable storage devices 1236, non-removable storage devices 1238, or a combination thereof. Examples of removable storage and non-removable storage devices include magnetic disk devices such as flexible disk drives and hard-disk drives (HDDs), optical disk drives such as compact disk (CD) drives or digital versatile disk (DVD) drives, solid state drives (SSDs), and tape drives to name a few. Example computer storage media can include volatile and nonvolatile, removable and non-removable media implemented in any method or technology for storage of information, such as computer readable instructions, data structures, program modules, or other data.

System memory 1206, removable storage 1236 and non-removable storage 1238 are all examples of computer storage media. Computer storage media includes, but is not limited to, RAM, ROM, EEPROM, flash memory or other memory technology, CD-ROM, digital versatile disks (DVDs) or other optical storage, magnetic cassettes, magnetic tape, magnetic disk storage or other magnetic storage devices, or any other medium which can be used to store the desired information and which can be accessed by computing device 1200. Any such computer storage media can be part of device 1200. Thus, any of the computer storage media may be implemented using the circuit structures for convolution applications as discussed herein.

Computing device 1200 can also include an interface bus 1240 for facilitating communication from various interface devices (e.g., output interfaces, peripheral interfaces, and communication interfaces) to the basic configuration 1202 via the bus/interface controller 1230. Example output devices 1242 include a graphics processing unit 1248 and an audio processing unit 1250, which can be configured to communicate to various external devices such as a display or speakers via one or more A/V ports 1252. Example peripheral interfaces 1244 include a serial interface controller 1254 or a parallel interface controller 1256, which can be configured to communicate with external devices such as input devices (e.g., keyboard, mouse, pen, voice input device, touch input device, etc.) or other peripheral devices (e.g., printer, scanner, etc.) via one or more I/O ports 1258. An example communication device 1246 includes a network controller 1260, which can be arranged to facilitate communications with one or more other computing devices 1262 over a network communication via one or more communication ports 1264. The communication connection is one example of a communication media. Communication media may typically be embodied by computer readable instructions, data structures, program modules, or other data in a modulated data signal, such as a carrier wave or other transport mechanism, and includes any information delivery media. A "modulated data signal" can be a signal that has one or more of its characteristics set or changed in such a manner as to encode information in the signal. By way of example, communication media can include wired media such as a wired network or direct-wired connection, and wireless media such as acoustic, radio frequency (RF), infrared (IR) and other wireless media. The term computer readable media as used herein can include both storage media and communication media.

Computing device 1200 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 1200 can also be implemented as a personal computer including both laptop computer and non-laptop computer configurations.

The present disclosure is not to be limited in terms of the particular embodiments described in this application, which are intended as illustrations of various aspects. Many modifications and variations can be made without departing from its spirit and scope. Functionally equivalent methods and apparatuses within the scope of the disclosure, in addition to those enumerated herein, are possible. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, compounds, or compositions, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations.

However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include, but not be limited to, systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

Further, the use of the terms "first," "second," "third," "fourth," and the like is to distinguish between repeated instances of a component or a step in a process and does not impose a serial or temporal limitations unless specifically stated to require such serial or temporal order.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," or the like include the number recited and refer to ranges which can be subsequently broken down into subranges as discussed above. Finally, as will be understood by one skilled in the art, a range includes each individual member. Thus, for example, a group having 1-3 elements refers to groups having 1, 2, or 3 elements. Similarly, a group having 1-5 elements refers to groups having 1, 2, 3, 4, or 5 elements, and so forth.

While various aspects and embodiments have been disclosed herein, other aspects and embodiments are possible. The various aspects and embodiments disclosed herein are for purposes of illustration and are not intended to be limiting, with the true scope and spirit being indicated by the following claims.

What is claimed is:

1. A parallel convolutional computation circuit device comprising:
   a controller circuit;
   a feature manager circuit configured to receive input feature data;
   a kernel manager circuit configured to receive input kernel data;
   a row convolution processing block comprising a plurality of row processors, each of the plurality of row processors configured to:
   receive one row of the input feature data from the feature manager circuit, all the input kernel data from the kernel manager circuit, input convolutional data, and controlling data from the controller circuit; and
   compute accumulated convolutional data based on a restricted convolution operation controlled by the controlling data using M*K+C, where M is the input feature data, K is the input kernel data, C is the input convolutional data, and * is the restricted convolution operation, wherein the row convolution processing block further comprises:
   a selector configured to select one row from the input kernel data;

a multiplier matrix configured to produce products between feature row data and kernel row data;

an array of filters configured to filter the products by resetting part of the products to zero according to the controlling data, an array of adders configured to produce a sum of the filtered products; and a convolutional data accumulator configured to receive the input convolutional data and accumulate the sum of filtered products to the input convolutional data.

2. The circuit device of claim 1, wherein the controlling data defines a vertical range and a horizontal range within the input feature data.

3. The circuit device of claim 1, wherein the input feature data is in form of an m×n matrix.

4. The circuit device of claim 1, wherein the input kernel data is in form of a (2m−1)×(2n−1) matrix.

5. The circuit device of claim 1, wherein the input convolutional data is in form of an m×n matrix.

6. The circuit device of claim 1, wherein the feature manager circuit comprises m rows of n data buffers and is further configured to store the input feature data and rotate values between rows during one restricted convolution computation.

7. The circuit device of claim 6, wherein the feature manager circuit further comprises an array of bias values, one for each row data, wherein the bias values are updated according to a rotation direction.

8. The circuit device of claim 6, wherein the feature manager circuit further comprises an array of filters configured to set output feature row data either to stored row data or zeros according to the controlling data and a row bias.

9. The circuit device of claim 1, wherein the kernel manager circuit comprises a (2m−1)×(2n−1) matrix of data buffers and is further configured to store the input kernel data in the buffers and cyclically rotate values in upwards, downwards, leftwards and rightwards directions for different restricted convolution computations.

10. The circuit device of claim 1, wherein the row convolution processing block is configured to perform core convolution for each sub-matrix within feature data matrix and all neighboring sub-matrices as compensated convolution, and wherein a kernel is rotated horizontally or vertically during the compensated convolution according to a relative position of a neighboring sub-matrix.

11. A method for operating a parallel convolutional computation circuit device, the method comprising:

receiving input feature data at a feature manager circuit;

receiving input kernel data at a kernel manager circuit;

receiving controlling data that defines a vertical range and a horizontal range within the input feature data at a controller;

receiving, at a row convolution processing block comprising a plurality of row processors, one row of the input feature data from the feature manager circuit, all the input kernel data from the kernel manager circuit, input convolutional data, and the controlling data from the controller;

computing, at the row convolution processing block, accumulated convolutional data based on a restricted convolution operation controlled by the controlling data by:

selecting one row from the input kernel data at a selector of the row convolution processing block;

producing products between feature row data and kernel row data at a multiplier matrix of the row convolution processing block;

filtering the products by resetting part of the products to zero according to the controlling data at an array of filters of the row convolution processing block, producing a sum of the filtered products at an array of adders of the row convolution processing block; and receiving the input convolutional data and accumulating the sum of the filtered products to the input convolutional data at the row convolution processing block.

12. The method of claim 11, wherein receiving the input feature data comprises receiving the input feature data in form of an m×n matrix, receiving the input kernel data comprises receiving the input kernel data in form of a (2m−1)×(2n−1) matrix, and receiving the input convolutional data comprises receiving the input convolutional data in form of an m×n matrix.

13. The method of claim 11, further comprising:

storing the input feature data and rotating values between rows during one restricted convolution computation at m rows of n data buffers of the feature manager circuit.

14. The method of claim 11, further comprising:

updating bias values stored at an array of bias values of the feature manager circuit, one for each row data, according to a rotation direction.

15. The method of claim 11, further comprising:

setting output feature row data to stored row data or zeros according to the controlling data and a row bias at an array of filters of the feature manager circuit.

16. The method of claim 11, further comprising:

storing the input kernel data and cyclically rotating values in upwards, downwards, leftwards and rightwards directions for different restricted convolution computations at a (2m−1)×(2n−1) matrix of data buffers of the kernel manager circuit.

17. The method of claim 11, further comprising:

performing core convolution for each sub-matrix within feature data matrix and all neighboring sub-matrices as compensated convolution; and rotating a kernel horizontally or vertically during the compensated convolution according to a relative position of a neighboring sub-matrix.

18. The method of claim 11, further comprising:

accumulating the sum of filtered products to the input convolutional data for a convolutional neural network.

* * * * *